J. SCOVIL.
Grain Drill.
No. 44,462.
Patented Sept. 27, 1864.
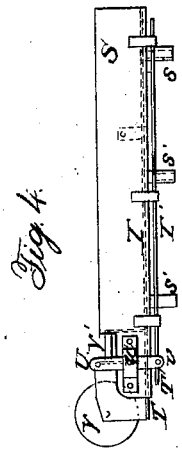
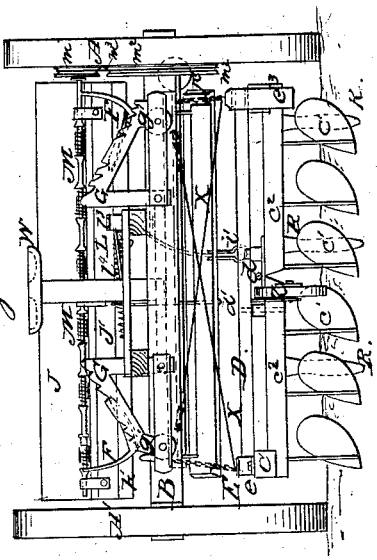
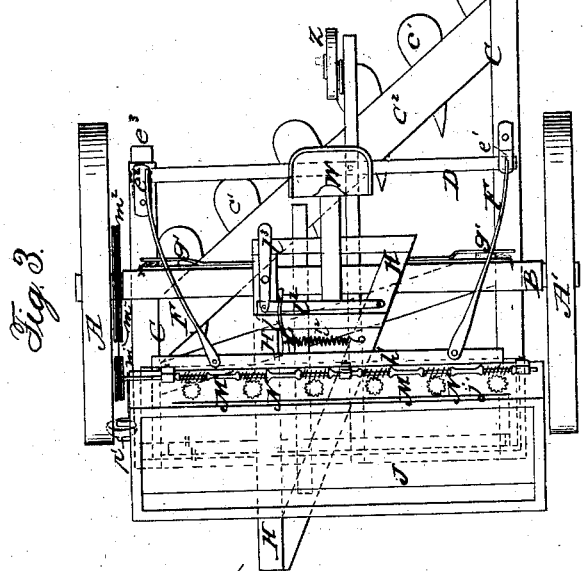
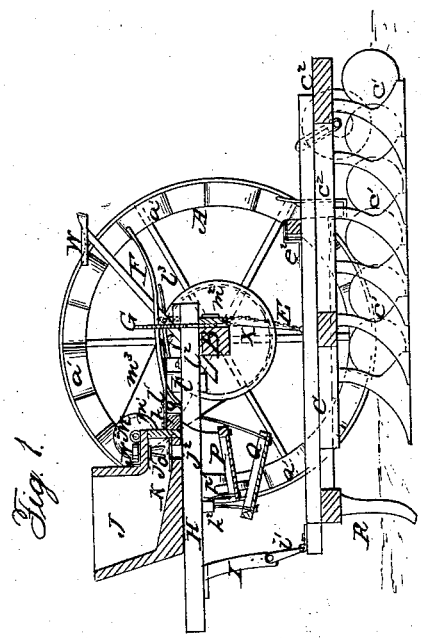
Witnesses:
E. B. Forbush
Geo. N. Wallace
Inventor:
Jasper Scovil ic
UNITED STATES PATENT OFFICE.

JASPER SCOVIL, OF HAMBURG, NEW YORK.

SEED-SOWER.

Specification forming part of Letters Patent No. 44,462, dated September 27, 1864.

*To all whom it may concern:*

Be it known that I, JASPER SCOVIL, of Hamburg, county of Erie, State of New York, have invented a certain new and Improved Cultivator and Seed-Sower; and I do hereby declare that the following is a full, clear, and exact description thereof, reference being had to the accompanying drawings, making a part of this specification, in which—

Figure I is a vertical section of my improvement. Fig. II is an end elevation, and Fig. III is a top plan, of the same. Fig. IV represents a seed-box used in connection with the plows for planting seed in rows.

The nature of this invention consists, first, in the arrangement and combination, with a seed-box of a worm-shaft and worm-wheels, located one over each opening in the bottom of the said box, with fingers projecting downward, by means of which fingers, when revolved by the worm shaft and wheels, the openings in the seed-box will be constantly kept clear and any stoppage of the same be prevented; second, in the arrangement and combination of spreading-boards, with the seed-box of a seeding-machine, to catch the seed as it drops out of the seed-box and spread it for sowing broadcast; third, in the construction of a planting-box having double and reverse acting slides and tubes for holding the required number of kernels for a hill and the combination thereof with a seed-sowing machine, so that the machine may be used for planting in hills or for sowing broadcast.

This machine is an improvement upon the machine patented to me on the 22d day of December, 1853.

Letters of like name and kind refer to like parts in each of the figures.

A A' represent the carrying-wheels.

B is the axle.

C represents the pendent adjustable plow-frame, and $c'$ the plows fastened to the diagonal plow-beam $c^2$. This plow-frame is divided in or about the center and both parts connected by hinges, as shown at $d$, Fig. II, thus permitting the center of the plow-frame, with the plows, to be lowered and made free to adapt itself to the unevenness of the ground. A bar, D, having its fulcrum at $d'$, holds the center of the plow-frame in its highest—i. e., horizontal—position by means of the clamps $e'$ and $c^2$, placed one on each side beam of the plow-frame. A long perpendicular clamp, $e^3$, is fastened to the end of one of said side beams, which will catch one end of the bar D, thereby terminating the lowering of the center of the plow-frame. The plow-frame, as a whole, is raised and lowered by means of the chains E and levers F. One end of the chains is connected to the plow-frame and the other to the levers F.

G are notched bars for holding the levers, and thereby the plow-frame, at any height desired.

$g'$ are sheaves connected to the axle B, over which the chains pass.

X are bars or chains connected both to the plow-frame and main frame, one crossing the other in a manner to prevent a lateral movement of the plow-frame, and thereby its coming in contact with the carrying-wheels.

H is the stationary or main frame, to which the plow-frame is connected by means of the bar I and hinged clasp $i'$. The bar I has several holes in a perpendicular line, by means of which the plow-frame may be hung higher or lower, as desired. The clasp $i'$ is hinged to the front beam of the plow-frame.

$h'$ is a cross-timber to which the levers F are connected.

J is the main seed-box, placed on the fore part of the main frame, and $j'$ a covered extension of the same at its rear end, and about half its size. The bottom of the seed-box is inclined toward this extension $j'$, in which the distributing-holes $j^2$ (Fig. I) are situated. These are covered by a slide, K, which has corresponding openings, so that by a lateral movement of the slide the holes $j^2$ may be either closed entirely or opened sufficiently to let the desired quantity of seed pass out. The slide K is operated by a lever, L, connected therewith. A notched bar, $l'$, fastened to the main frame, provides a means to set the slide in any position to insure the distribution of the seed in the desired quantity. For the purpose of closing the holes $j^2$ at any moment, two levers, $l^2$ and $l^3$, are placed in such relative position to the lever L that if the operator presses his foot onto the projecting free end of the lever $l^3$ the same will lift the lever $l^2$, and with it, out of the notch in which it was placed, the lever L, which, when thus liberated, will be forced to its original position by the spring $l^4$, thereby closing the slide K.

M represents a worm-shaft, and N worm-wheels placed on the covered extension $j'$ of the seed-box, each worm-wheel being situated exactly over each distributing-hole $j^2$. The shafts of the wheels extend through the cover of the box $j'$ and are provided with fingers O, (Fig. I,) which, if revolved by the action of the worm shaft and wheels assume a stirring motion, thereby keeping the holes beneath them clear from obstructions and insuring a constant and even flow of seed from the seed-box. To the worm shaft M is connected the pulley $m'$, which is driven by the belt or rope $m^3$ and the pulley $m^2$, which is fastened to and revolving with the carrying-wheel A.

P represents a spreader hung by chains or links to the beams $h'$ and $h^2$ in a slightly forward inclined position, the raised back part of the spreader being placed in such relative position to the distributing-holes $j'$ as to receive the seed as it drops out of the box. There are flanges on the back part and the ends of this spreader to prevent the seed to spill off the same and compel it to slide down toward the fore part of the spreader, which is flat and open. At one end of this spreader a friction-wheel, $p'$, is placed, which touches the carrying-wheel A and cams $a'$ on the same. These cams are of equal size to the distance between them and present a smooth surface, producing an even and constant back-and-forth motion of the roller $p'$ and the spreader P, without sudden and percussive shocks. As the seed rolls off this spreader it is caught by another stationary spreader, Q, of similar description, although reversed position, its back flange being raised and slightly forward of the front edge of the spreader P, and its open front declining backward. From this spreader Q the seed falls right in front of the plows. The back of the spreader Q is hung to the beam $h^2$ by chains or links, while its front is held up by one chain, one end of which is connected to it in the middle. The other end of this chain may be fastened to the beam $h'$ or other place within reach of the operator, enabling him to regulate the decline of spreader Q according to the quantity of seed to be sown.

R are drills fastened to the front beam of the plow-frame in a common manner. In connection with these drills the seed-box J and spreaders P and Q cannot be used, and a planting-box, as shown at Fig. IV, is substituted in their place. This arrangement consists in the main box S, with openings in the bottom, and tubes S' leading downward therefrom, each tube descending immediately behind each drill.

T and T' are slides, one inside of the box S and the other below it, with tongues to fit slits made in the tubes S'. Both slides are connected at one end to the respective two ends of a lever, U, having its fulcrum at $u'$ on one side of the box S. The upper slide, T, is extended, and carries a friction-roller, V, which comes in contact with cams placed on carrying-wheel A', and gives the lever U, and with it the slides T and T', a vibrating motion. A spring, V', presses the friction-roller against the carrying-wheel A'. The slides T and T' are so constructed that at one motion the slide T will open the holes and the slide T' close the tubes, thereby allowing a quantity of seed sufficient for one hill to drop into the tube. At the next motion the slide T will close the holes and the slide T' open the tubes and drop the seed into the furrows made by the drills R, and so on alternately, thus producing an equal distribution of seed. The plows $c'$ will then cover the seed as the machine advances.

W is the driver's seat.

Z represents a small adjustable carrying-wheel, attached to the rear end of the plow-frame, which supports the center of the plow-beam, and by which the depth of furrow to be cut is regulated.

What I claim as my invention, and desire to secure by Letters Patent, is—

1. The perpendicular rotating fingers O, in combination with the worm-shaft M and worm-wheels N, deflecting-boards P and Q, when constructed and operating in the manner and for the purposes described.

2. The arrangement and combination of the spreading-boards P and Q with the seed-box of a seeding-machine so as to catch the seed as it drops out of the seed-box and spread it for sowing broadcast, substantially as and for the purposes set forth.

3. The removable planting-box S, having tubes S' and double and reverse acting slides T and T', so constructed and arranged that it may be attached to the frame of the seeding-machine so that the machine may be used for planting in hills, substantially as set forth.

4. Making the pendent plow-frame C hinged or jointed in the middle, for the purpose set forth, when used in a seeding-machine constructed in the manner described.

JASPER SCOVIL.

Witnesses:
GEO. W. WALLACE,
E. B. FORBUSH.